United States Patent

James (10) Patent No.: US 6,285,822 B1
(45) Date of Patent: *Sep. 4, 2001

(54) RECORDING AND/OR REPLAYING TELETEXT SIGNALS

(75) Inventor: Shirley J. James, Hamble (GB)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,024

(22) Filed: Mar. 14, 1997

(30) Foreign Application Priority Data

Mar. 18, 1996 (GB) .................................................. 9605614

(51) Int. Cl.[7] .............................. H04N 5/76; H04N 5/783
(52) U.S. Cl. ............................................... 386/95; 386/46
(58) Field of Search ............................... 386/46, 95, 129, 386/131, 1; 348/467, 468; H04N 5/76, 5/783

(56) References Cited

U.S. PATENT DOCUMENTS 4,543,616 * 9/1985 Brooks .................................... 386/46
5,565,997 * 10/1996 Terry ...................................... 386/46

* cited by examiner

Primary Examiner—Robert Chevalier
(74) Attorney, Agent, or Firm—Michael E. Belk (57) ABSTRACT

Standard binary teletext signals (which have a data rate exceeding the bandwidth of a standard VHS video recorder) are converted into a multilevel code so that the teletext data can be reliably recorded and replayed by a standard VHS video recorder. During recording teletext data is received at a high data rate and encoded in accordance with a multilevel code at a lower data rate and within the bandwidth of the VCR. During playback the multilevel code is decoded back into binary code at the standard teletext data rate and clock run-in and framing codes are added to provide standard teletext signal. The resulting teletext data is then combined with the video signal.

27 Claims, 6 Drawing Sheets

CONTROL & TIMING GEN. IN FIG.4

FIG. 8

RECORDING AND/OR REPLAYING TELETEXT SIGNALS

BACKGROUND OR THE INVENTION

1. Field of the Invention

The invention relates to the field of recording and/or replaying standard video data using a video recorder.

2. Description of the Related Art

It is well known that it is not possible to reliably record and replay teletext data using a standard VHS video cassette recorder, principally because the bandwidth of the VHS channel is very limited. The luminance bandwidth is 2.9–3 MHz which can be reduced to 2 MHz on playback when the sharpness control is set to "soft". As a comparison the bandwidth of a normal broadcast video channel is of the order of 5.5 MHz. The limited VHS bandwidth has proved acceptable with normal video signals, the effect being to soften or blur the picture to an extent which has proved to be acceptable to most viewers. When teletext was first specified, however, a high bit rate was chosen to make maximum use of the broadcast bandwidth. Unfortunately, this means that the high frequency part of the data signal, including the very important clock run-in signal, is obliterated by the recording and replay process. In addition most teletext decoders rely on the very close line timing tolerances achieved by broadcast transmissions. The decoders can be completely upset by synchronising jumps created just before the vertical blanking interval (VBI) by the recorder head switching. Further problems are caused by the variation in line frequency caused by stretched tapes which can cause a variation of ±3% in line frequency.

It has been proposed in EP-A-0 608 960 (PHB 33832), to U.S. Pat. No. 5,565,997, issued Oct. 15, 1996, that teletext data should be recorded on VHS tapes at a lower bit rate by decoding the teletext data and expanding the data packets by a factor of four. This data is then spread across five VBI lines, to allow for guard periods. On replay the data packets from the five lines are compressed to restore the data rate to that in the teletext specification to enable display of the data.

The above citations are hereby incorporated herein in whole by reference. Such an arrangement enables the teletext data to be recorded on and replayed from a VHS recorder but suffers from the disadvantage that it is impossible to record all the teletext pages that are transmitted as there are insufficient VBI lines to accommodate them. Consequently a selection of the pages to be recorded has to be made at the time of recording and as a result only those selected pages can be displayed when the tape is replayed.

A further proposal in GB-A-2132856 is that the teletext data be written into a buffer store at the standard teletext data rate and read out at half that rate for recording on tape. In this instance no selection of pages to be stored is made, but correct operation depends on there being at least twice as many VBI lines available as are used for teletext data transmission. This is not currently the case in the UK where more than half the available VBI lines contain teletext data or other data.

SUMMARY OF THE INVENTION

It is an object of the invention to enable the provision of a method of and apparatus for recording and/or replaying teletext data using a video recorder having a bandwidth of less than the bandwidth of a broadcast channel, as a result of which it is possible to record and/or replay all the teletext data transmitted.

The invention provides a method of recording teletext data on a record carrier using a recording apparatus having a bandwidth of less than the standard teletext data rate including the steps of receiving teletext data at the standard data rate, converting the teletext data to a multilevel code, at a data rate which falls within the bandwidth of the recording apparatus, and recording the multilevel code on the record carrier.

By converting the teletext data to a multilevel code the data rate can be reduced. For example a four level (or quaternary) code allows two bits to be encoded for each data period and consequently allows the data rate to be halved. By this means the teletext data transmitted in one VBI line can be recorded to a single VBI line in the recorder without requiring broadcast bandwidth. Consequently it is then possible to record all the teletext data broadcast as part of a programme which is being recorded. This means that it is not necessary at the time the recording is being made to decide which teletext data to record and that this choice can be made from the total transmitted data at the time the programme is being replayed.

The multilevel code may include a signal having more than two amplitude levels. In this case the multilevel code is coded in terms of signal amplitude. An alternative would be to provide a multi phase signal, a four phase signal giving the same possibility of encoding two bits in each data period. Of course, a combination of phase and amplitude could be used to form the multilevel code.

The multilevel code may have eight levels and a data rate one third of that of the standard teletext signal. As is readily apparent to the skilled person an eight level code will enable three bits to be encoded in each data period and will consequently allow the data rate to be reduced to one third of the data rate of a binary signal.

The invention further provides a method of replaying teletext data from a record carrier using replay apparatus having a bandwidth of less than the standard teletext data rate, the teletext data being recorded on the record carrier by means of a multilevel code at a data rate which is lower than the standard teletext data rate, the method including the steps of reading the multilevel code from the record carrier, converting the multilevel code to standard teletext data, and applying the teletext data to a teletext encoder.

The data recorded on the record carrier may be by the method according to the invention when the recording apparatus is used to record a broadcast programme (including cable television), or may be inserted on the record carrier from a pre-recorded tape or disc.

The invention still further provides apparatus for recording teletext data on a record carrier, the recording apparatus having a bandwidth of less than the standard teletext data rate, the apparatus including apparatus for receiving a video signal including teletext data, apparatus for detecting received valid teletext data, apparatus for encoding the received teletext data into a multilevel code at a data rate which is less than the standard teletext data rate, and apparatus for recording the multilevel code on the record carrier.

The apparatus for encoding teletext data may include apparatus for applying the received teletext data to an encoder in n-bit packets, where n is an integer greater than one, apparatus for converting each n-bit packet into a multilevel code having at least one level for each n-bit combination, and apparatus for feeding the multibit code to the record head of the recoder at a data rate of 1/n times the standard teletext data rate.

The packets may be of two or three bits, which correspond to four or eight level codes respectively. The four level code allows the data rate to be halved whereas the eight level code will allow it to be reduced to one third of the original rate. The more levels allowed the greater the reduction in data rate but the greater the difficulty in distinguishing between them.

A buffer RAM may be connected between the apparatus for detecting teletext data and the encoder.

This enables timing to be simplified. It will be apparent that some time is needed to detect that teletext signals are being received on any given VBI line. There fore, to encode and reinsert the data on the same VBI line would require very fast decisions and encoding. By providing a buffer store the data can be reinserted either on a succeeding line of the VBI, if available, or on a line in the VBI of the next field or frame.

The buffer RAM may receive only teletext data packets, the encoder including apparatus for generating the clock run in and framing code.

This enables the size of the buffer RAM to be minimised, which may be particularly important if the insertion of data is delayed by a field or frame period since the RAM will then have to store several lines of data.

The invention still further provides apparatus for replaying teletext data from a record carrier, the teletext data being encoded by means of a multilevel code at a data rate less than the standard teletext data rate, the apparatus including apparatus for feeding the multilevel code signal to a decoder which is arranged to convert the multilevel code to a binary code at the standard teletext data rate and apparatus for multiplexing the binary code with the video signal for application to a teletext decoder.

The data may have been recorded on the tape by the method or apparatus set forth hereinbefore or may have been produced on a pre-recorded tape. This may particularly be the case for a proposed teletext version of the V chip code which is proposed as a means of encoding broadcast or tape material as to its category as far as, for example violent scenes or scenes of a sexual nature are concerned. This enables television sets to either display the category or to scramble or de-scramble the video signal depending on the category encoded and on that entered into the television set by a user having appropriate authorization, for example by PIN number.

The multilevel code may be a four level code, the decoder producing two bits from each four level code. Alternatively the multilevel code may be an eight level code, the decoder producing three bits from each eight level code.

Data from the decoder may be written into a buffer RAM. The apparatus may further include a teletext encoder, the teletext encoder being arranged to receive data from the buffer RAM. The teletext encoder may include apparatus for generating the clock run-in and framing code.

The encoder may include an equaliser, which may be a decision feedback equaliser.

The provision of an equaliser improves the decoder performance particularly in the presence of noise.

BRIEF DESCRIPTION OF THE DRAWINGS

The above and other features and advantages of methods and apparatus according to the invention will be apparent from the following description, by way of example, of an embodiment of the invention with reference to the accompanying drawings in which.

DESCRIPTION OF THE PREFERRED EMBODIMENTS

Figure 1A:
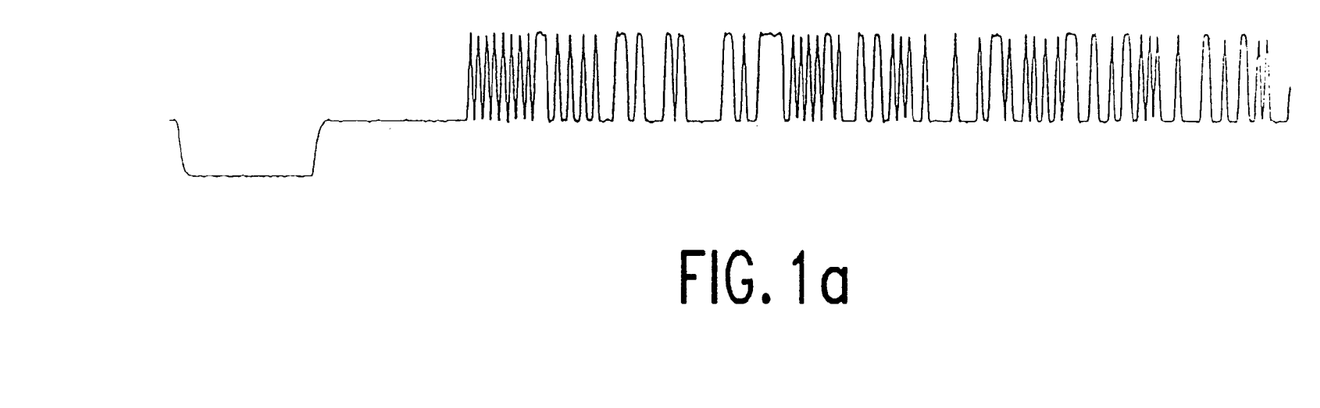
FIGS. 1a and 1b respectively shows a standard broadcast teletext signal and the effect of the restricted bandwidth of a VHS video recorder on this signal.
Figure 1B:
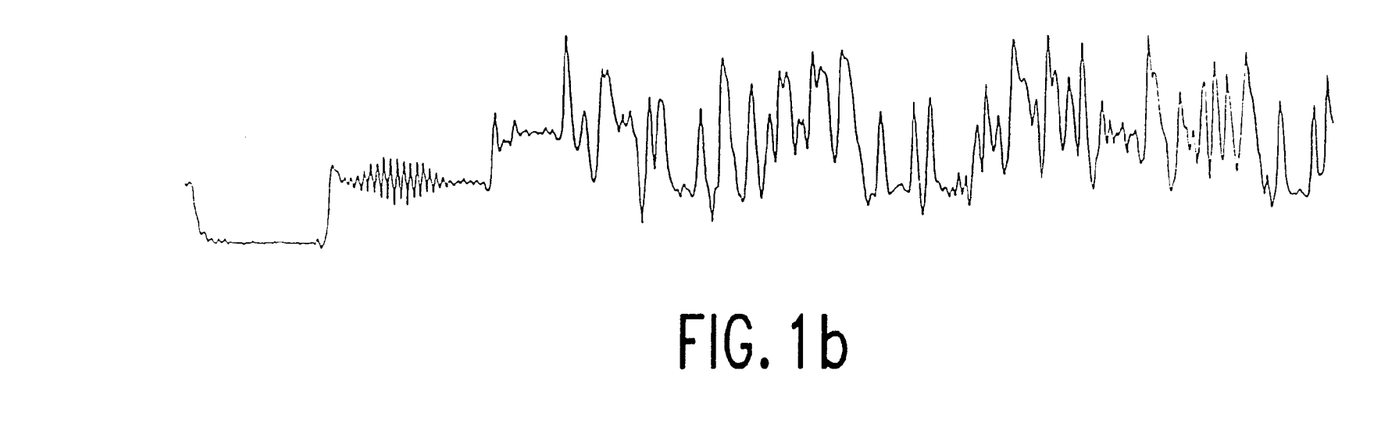

FIG. 1a shows a standard teletext signal as received by a receiver. The data rate of the teletext signal is greater than 5 MHz and consequently such a signal will be distorted when it is fed through a video recorder such as one according to the VHS standard which has a channel bandwidth of around 3 MHz. FIG. 1(b) shows how the teletext signal is affected by the channel band width of a typical VHS recorder. As can be seen the initial clock run-in information is lost and on replay such a signal would not be decodable by standard teletext decoder.

In order to overcome this problem the present invention utilises a multilevel code which has a data rate which is lower than that of the standard teletext data rate.

Figure 2:
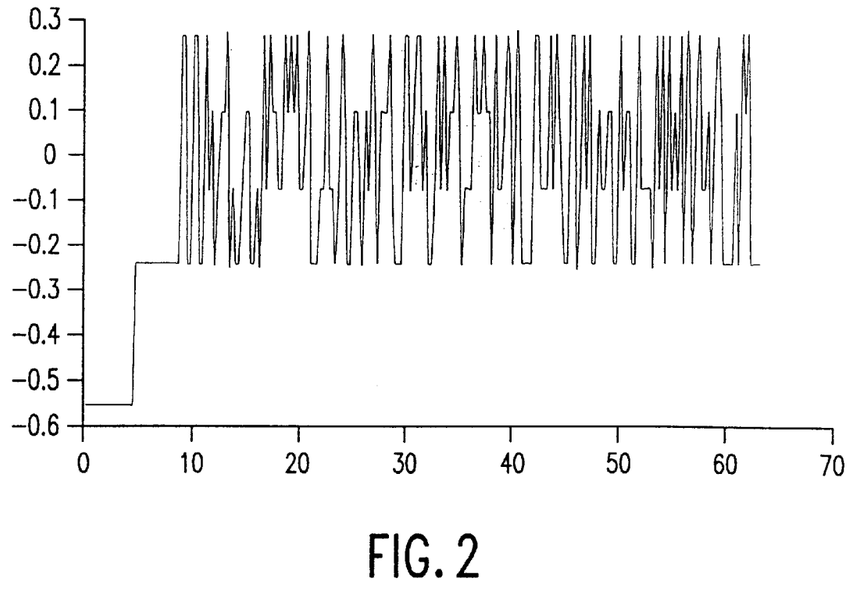
FIG. 2 shows a four level code representing the broadcast teletext signal which is suitable for recording on and replay from a VHS recorder.

FIG. 2 shows a line of teletext data encoded according to a four amplitude level code. The initial clock run-in has been replaced by a lower frequency clock run-in while the framing code and data are replaced by the four level code. The four levels in this instance are four amplitude levels and consequently in each data period two bits can be encoded, the four levels giving the codes 00, 01, 10, and 11. As a result the teletext signal re-encoded according to the multilevel code now has a data rate of half that of the received teletext signal and now falls within the bandwidth of the VHS recorder.

Figure 3:
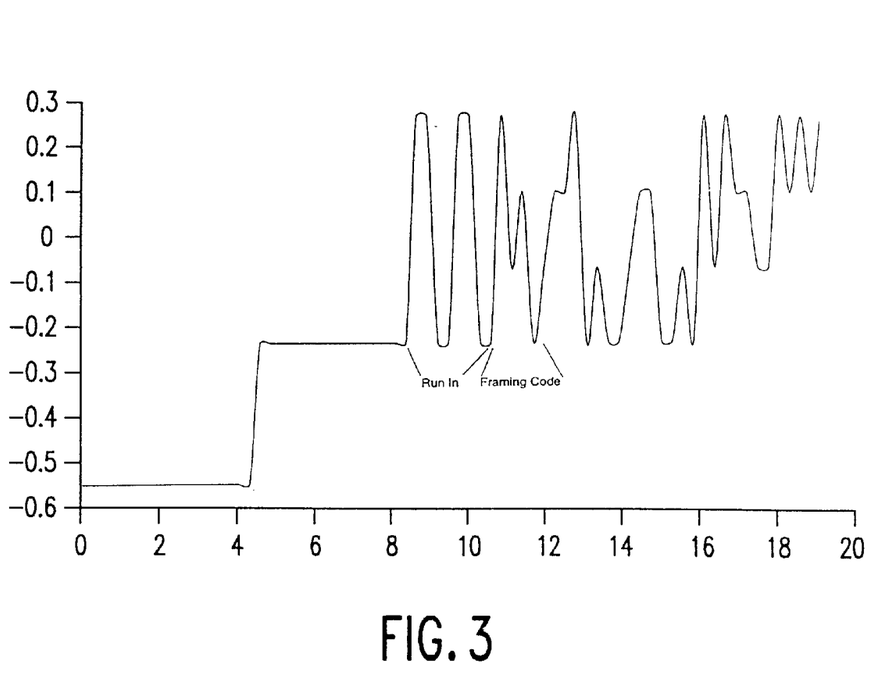
FIG. 3 shows on an enlarged time scale a portion of the signal shown in FIG. 2.

FIG. 3 shows the initial part of a teletext line using the multilevel code on an expanded time scale and indicates the cycles of clock run in, the framing code and the data. In this case the clock run in frequency is arranged to be half that of the standard teletext clock run in frequency.

Thus a method of recording teletext data according to the invention includes comprises the steps of receiving the teletext data at the standard data rate and then converting the teletext data into a multilevel code at a data rate which is lower than that of the standard teletext signal. The multilevel code is then applied to the record head of the recorder to enable the data to be recorded on the tape. In this particular embodiment a four amplitude level code is used and the data rate is half that of the standard teletext signal. If an eight level code was used then the data rate could be reduced to one third of the standard teletext data rate since an eight level code would allow each data period to encode three bits.

While it is preferred, however, to use a multiple amplitude level code as this simplifies the recovery of data by a standard teletext decoder, it is possible either to use a multilevel code including a number of different phases or to use a combination of phase and amplitude levels.

On replay, the multilevel code is read from the tape and then converted to standard teletext data in an inverse operation to the conversion on recording. This data can then be fed into a teletext encoder to enable the teletext data to be reassembled with the video signal for transmission to an associated television receiver.

Figure 4:
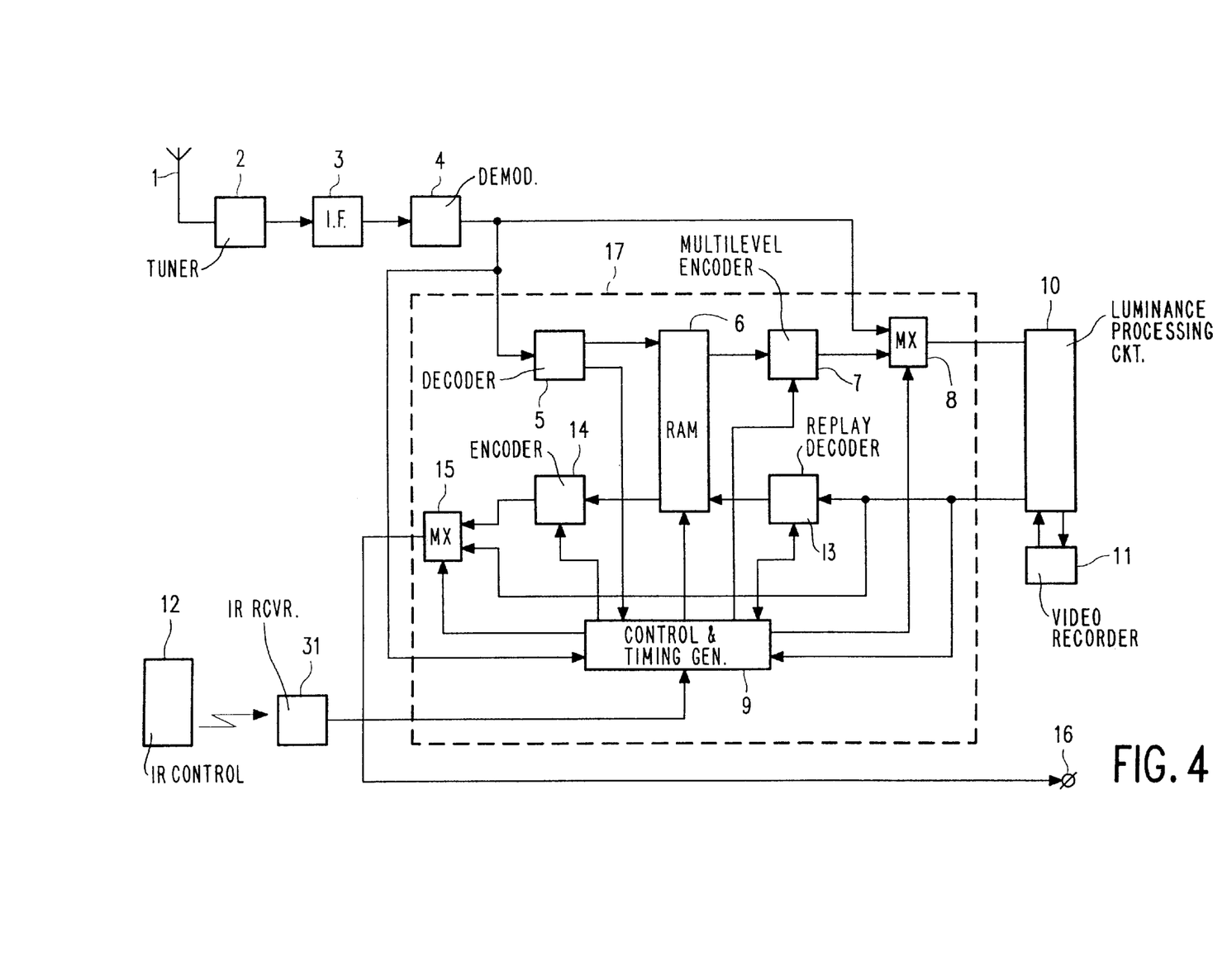
FIG. 4 is a block schematic diagram of a video tape recorder constructed to carry out the invention

FIG. 4 is a block diagram of a video recorder which is capable of carrying out the methods of recording teletext data and replaying teletext data according to the invention. The video recorder shown in FIG. 4 includes an aerial 1 which is connected to a tuner 2. The tuner 2 feeds an intermediate frequency stage 3 whose output is fed to a demodulator 4 which produces at its output a combined video and blanking signal (CVBS). The combined video and blanking signal is fed to the input of a teletext decoder 5 whose output is connected to a buffer RAM 6. The buffer RAM 6 is connected to an encoder 7 which produces from the data read from the RAM 6 the multilevel code for recording on the tape. The output of the encoder 7 is fed to a first input of a multiplexer 8 whose second input receives the combined video and blanking signal from the output of the demodulator 4. A control and timing signal generator 9 produces a signal which causes the signal at either the first or the second input to be fed to the multiplexer output. As a result CVBS and the teletext data are available at the output of the multiplexer 8 at the appropriate times. The output of the multiplexer 8 is fed to the normal luminance processing circuitry 10 of the video recorder from whence it passes to the record and replay head 11 of the recorder. The CVBS is also applied from the output of the demodulator 4 to the control and timing generator 9. Thus various timing signals can be derived from the line and field synchronising pulses in the CVBS in a standard manner within the control and timing signal generator 9. The teletext decoder 5 detects that teletext signals are being transmitted and that valid data is being received. Thus it will detect the clock run in and framing codes and generate a signal which is passed to the control and timing signal generator 9. The generator 9 then produces a control signal which is applied to the RAM 6 to cause the remaining data in a line to be written into the buffer RAM 6. As this detection takes some time it is necessary to include the buffer RAM 6 to enable timing to be properly achieved. The buffer RAM may delay the insertion of the teletext signal by one or more line periods or a field or frame period. The shorter the period of delay the smaller the size of RAM required.

Having established that a valid teletext signal has been received, the teletext data is presented two bits at a time to the encoder 7 which produces a four level code at its output from the two bits of data at its input. This four level code is delivered to the multiplexer 8 at half the teletext data rate under the control of the control and timing signal generator 9. The teletext data encoded into the multilevel code and modified clockrun in and framing code generated in the encoder is then multiplexed with the CVBS signal by means of the multiplexer 8 and fed to the luminance processing circuit 10 in the video recorder for recording on the tape. The control and timing signal generator 9 also receives inputs which serve to determine whether the signal is to be recorded or replayed. In this example these signals are generated by a remote control unit 12 which communicates with an infra red receiver 13. The remote control unit 12 will include keys by means of which the user can selected either the record or replay function. It is of course possible to provide alternatively or in addition keys on the video recorder which the user can operate instead of the remote control.

On replay the CVBS signal which contains the teletext data encoded according to the method of the invention is read from the tape by the tape head 11 and fed by the luminance processing circuitry 10 to a decoder 13 and to the control and timing generator 9. The decoder 13 detects the levels of the teletext portion of the signal and converts the encoded teletext signal to a teletext code. Thus at each data period the encoded teletext signal is converted into two bits which are fed to the RAM 6. The decoder 13 will include apparatus for detecting the encoded clock run in period and framing code to determine the start of the teletext data and to determine that in fact a teletext signal has been produced from the tape. The fact that a clock run in and framing code has been detected will be signalled to the control and timing signal generator 9 which will then control the writing of the data produced at the output of the decoder 13 from the multilevel code applied to its input into the RAM 6.

Preferably the data read into the RAM 6 will not include the clock run in and framing code as this is constant for each line of the teletext signal and consequently the storage capacity needed for that part of the signal would be superfluous. By this means, the size of the buffer RAM 6 can be minimised.

The data from the buffer RAM 6 is read under the control of the control and timing signal generator 9, to a teletext encoder 14. The teletext encoder 14 will reinsert the clock run in and framing code and assemble the data from the RAM into standard teletext packets. The encoded teletext data is fed from the teletext encoder 14 to a first input of a multiplexer 15 while the CBVS signal from the luminance processing circuit 10 is fed to a second input of the multiplexer 15. The control and timing signal generator 9 is further connected to the multiplexer 15 to switch its output between the teletext data and the CBVS signal at the appropriate times to produce a signal at output 16 which may be fed to a television set for display.

The addition of the apparatus within the dotted box 17 to a standard VHS video recorder enables teletext data to be recorded on tape using a VHS video cassette recorder and be replayed from the tape and converted back to the normal teletext data standard for application to a television receiver. By this means it is possible to record all the teletext data which is transmitted by a broadcaster during the time the VHS cassette recorder is set to record the program being transmitted. It is then unnecessary to select which teletext data is required to be recorded at that time. The previous proposals for recording teletext on a tape recorder have required the user to decide at the time of the recording which teletext data should be recorded. They have also required the use of a full teletext decoder including elements such as the page memory within the video cassette recorder in order to produce the teletext signal output.

In the embodiment shown in FIG. 4 according to the invention the teletext data is converted to a multilevel code but it is not necessary to decode the data itself. The only data which is decoded is the framing code to ensure that a proper teletext signal is being received and to enable the encoder to combine bits within a byte and not across by the byte boundaries. Thus while the teletext detector 5 performs some of the functions of a teletext decoder it does not need to be a full teletext decoder. The functions it has to perform are to slice the data, detect that a teletext line is being received, and, preferably, detect satisfactory receipt of the framing code.

Figure 5:
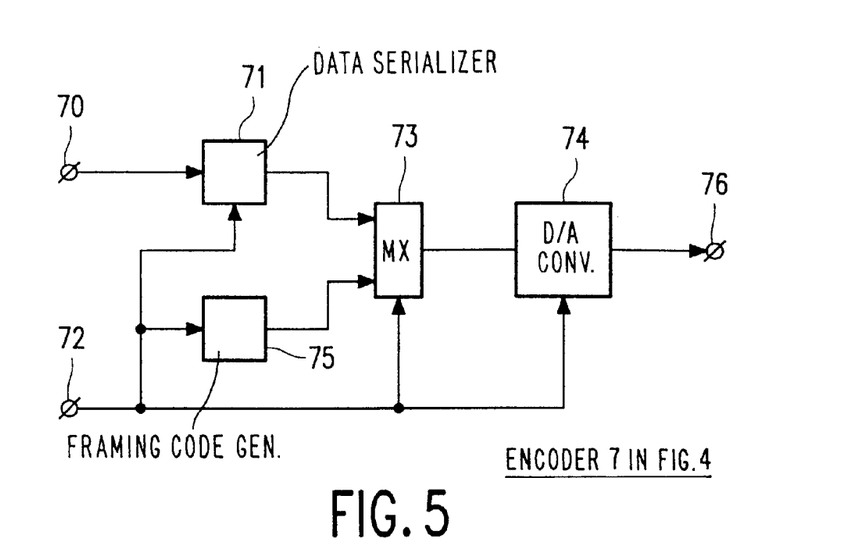
FIG. 5 is a block schematic diagram of an encoder suitable for use in the recorder of FIG. 4

FIG. 5 shows in greater detail an exemplary embodiment of the teletext signal encoder 7 of FIG. 4 which encodes the teletext data into a multilevel code. As shown in FIG. 5 the encoder has an input 70 to which the data from the RAM 6 is applied. The input is connected to a data serialiser 71 which takes an eight bit byte of the input data at a time and converts it into four bit codes at half the data bit rate. A second input 72 receives control and timing signals from the control and timing signal generator 9. This input is connected to a second input of the data serialiser 71 and provides the half data rate clock which makes available the two bit codes defining the four level signal at the correct time at the output of the serialiser 71. This is fed via a multiplexer 73 to a digital to analogue converter 74. The digital to analogue converter 74 will convert the digital signal from the data serialiser 71 into a four level analogue code. In the preferred embodiment this four level code gives four levels of amplitude for the signal. Timing for the digital to analogue converter 74 is derived from the signals on the input 72 generated by the control and timing signal generator 9. In addition at the beginning of each teletext data line a signal is sent from the control and timing signal generator 9 which is connected to a clock run in and framing code generator 75. Since the clock run in and framing code are constant for every line it is not necessary to store these parts of the signal in the buffer RAM 6. By providing a separate generator 75 for these signals it is possible to reduce the size of the RAM 6. The digital to analogue converter 74 converts either the clock run and framing code generated by the generator 75 or the data serialised in the data serialiser 71 depending on the control signals from the control and timing signal generator 9 which switches the appropriate input of the multiplexer 73 to the digital to analogue converter 74. The output of the digital to analogue converter 74 is fed to an output 76 which is connected to the first input of the multiplexer 8 for transmission to the tape record head.

Figure 6:
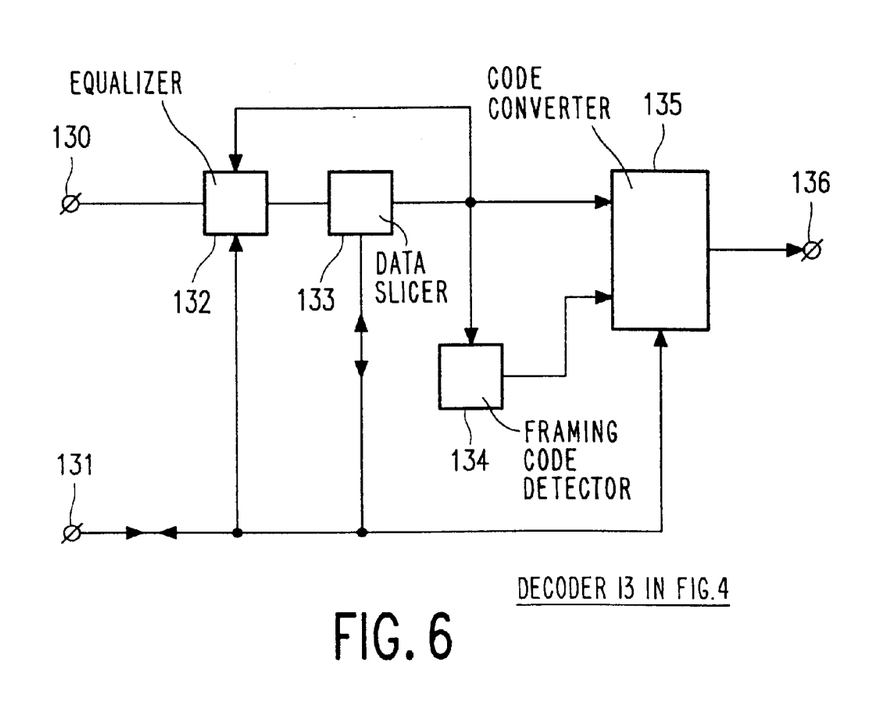
FIG. 6 is a block schematic diagram of a decoder for suitable use in the recorder of FIG. 4.

FIG. 6 shows in greater detail an embodiment of a decoder suitable for use as the decoder 13 of FIG. 4. As shown in FIG. 6 the decoder has an input 130 which receives the signal from the luminance processor 10 and a second input 131 which receives control and timing signals from the control and timing signal generator 9. The input signal from the luminance processor 10 is applied to the input of an equaliser 132 whose output is fed to a data slicer and clock recovery circuit 133. The equaliser 132 may be formed as decision feed back equaliser in which case the output of the data slicer is fed back to equaliser 132. The output of the data slicer is also connected to a framing code detector 134. This detects when a framing code is present and has an output which is fed to a four level to binary code converter 135. The output of the data slicer 133 is also connected to the converter 135. The code converter 135 takes the four level signal and converts it to two binary digits at the standard teletext data rate using timing pulses from the control and timing signal generator 9 and appropriately is enabled or disabled by the output of the framing code detector 134 to ensure that the data converted by the code converter is in fact teletext data. The output of the code converter 135 is fed to an output 136 which is connected to the buffer RAM 6. Thus the decoder 13 takes the four level signal from the luminance processor 10 and converts in each data period into two bits at the teletext data rate. These bits are then fed into the RAM 6 from whence they will be fed to the teletext encoder 14 at the appropriate time under the control of the control and timing signal generator 9. The output of the framing code detector is also fed to an output 137 which is connected to the control and timing signal generator 9 to enable it to control the writing of the teletext data into the RAM 6.

The use of the equaliser 132 is not essential but is desirable in order to achieve acceptable performance. Whether or not the equaliser is required will depend very largely on the channel characteristics of the video recorder and how much noise is introduced into the signal before it is applied to the decoder 13. It is believed that the use of the equaliser 132 is necessary if it is required to produce a comparable performance to that obtained when teletext is decoded directly off air when reproducing teletext recorded on a VHS recorder using the present invention.

Figure 7:
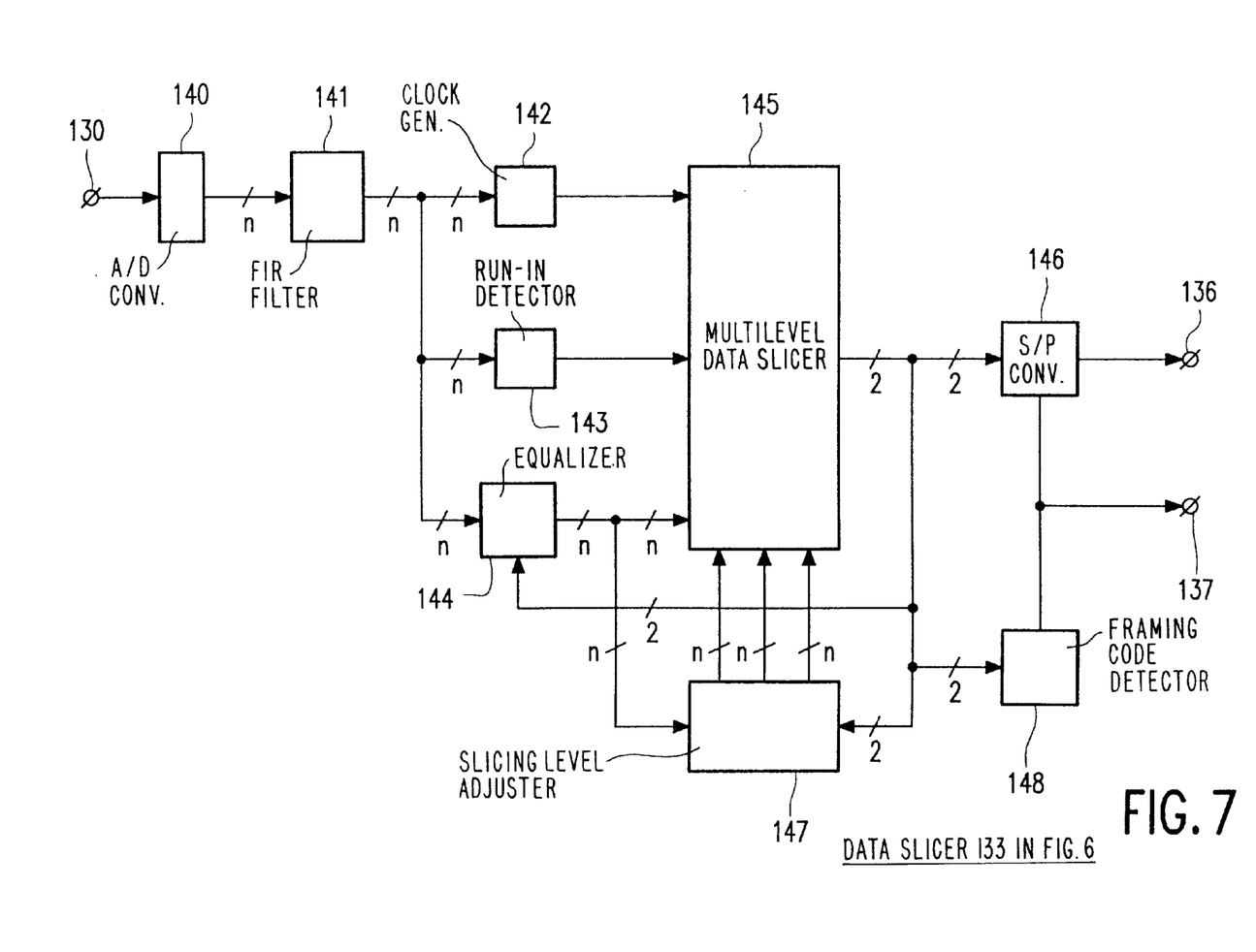
FIG. 7 is a block schematic diagram of a more detailed embodiment of a decoder suitable for use in the recorder of FIG. 4.

FIG. 7 shows in greater detail one embodiment of the data slicing function of the decoder of FIG. 6. As shown in FIG. 7 the CVBS output from the luminance processor 10 is fed to the input 130. An analogue to digital converter 140 converts the CVBS signal to an n-bit digital signal and applies it to a FIR filter 141 which forms a notch filter to remove any colour sub-carrier components. The n-bit output of the filter 141 is connected to the input of a teletext clock generator 142, to a run in detector 143, and to a decision feedback equaliser 144. The output of the teletext clock generator 142 is connected to a first input of a multi level (four) adaptive data slicer 145, the output of the run in detector 143 is connected to a second input of the data slicer 145, and the n-bit output of the equaliser 144 is connected to a third input of the data slicer 145.

The data slicer 145 produces a 2 bit output which reproduces the data encoded on the tape during a single data bit period, that is it converts the four amplitude level code to a two bit digital word which is available at half the standard teletext data rate. These two bit words are assembled into 8 bit bytes in a serial to parallel converter 146 and the 8 bit bytes are then available to be written into the buffer RAM 6 as standard teletext data packets. The two bit digital word is also fed back from the output of the data slicer 145 to a further input of the equaliser 144 and to an input of a slicing level adjuster 147. The output of the equaliser 144 is fed to a further input of the slicing level adjuster 147. The slicing level adjuster produces three n-bit outputs which are fed to the data slicer 145 to enable the slicing level to be adapted to the previously sliced data, i.e the slicing level may be adjusted to take into account the previous signal state.

The data slicer 145 regenerates the teletext data from the equalised CVBS signal under the control of the teletext clock generated by the generator 142 (which will be nominally at half the standard teletext clock frequency but which will adjust to the rate as read from the tape) and the run in detector 143 which will indicate that teletext data is being received. The actual slicing level will be influenced by the slicing level adjuster 147. The two bit words produced at the output of the data slicer 145 are fed to a framing code detector 148, which when it detects a valid framing code will enable the serial to parallel converter 146 to cause teletext data bytes to be assembled and passed to the buffer memory 6 for storage.

Figure 8:
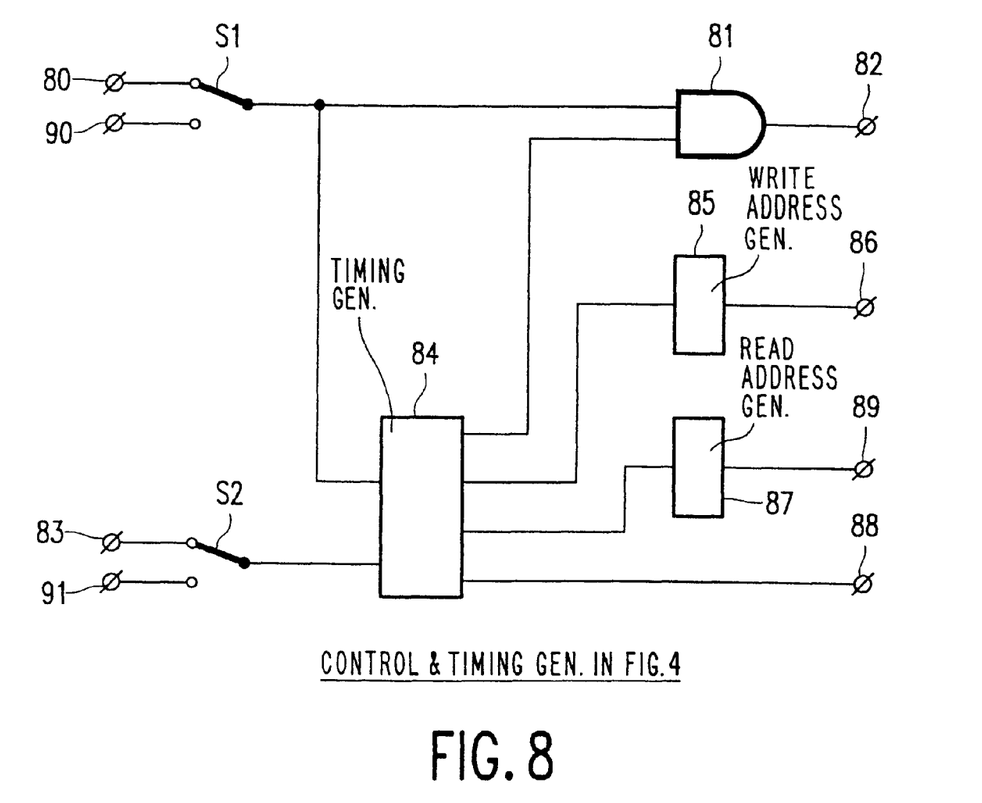
FIG. 8 is a block schematic diagram of a control and timing signal generator suitable for use in the recorder of FIG. 4.

FIG. 8 shows in more detail an embodiment of a control and timing signal generator which may be used as the control and timing signal generator 9 in FIG. 4. The control and timing generator shown in FIG. 8 includes two switches S1 and S2 which are controlled to be in the positions shown in the diagram when the recorder is set to record. Thus the operation of the switches S1 and S2 will depend on the control information fed from the user via the remote control unit 12 and infra red receiver 13. An input 80 receives a signal from the teletext decoder 5 when the clock run in and framing code has been correctly received and detected. This signal is fed to the first input of an AND gate 81 whose output is fed to an output 82 which provides a write enable signal for the buffer RAM 6. An input 83 receives the CVBS signal from the demodulator 4 and applies it to a timing generator 84. Also applied to the timing generator are clock pulses derived by the teletext detector 5 from the teletext broadcast signal. The timing generator 84 uses the teletext clock signals and the line and field synchronising signals to generate the various clock signals which are used to control the various elements of the arrangement 17. An output of the timing generator 84 is connected to a write address generator 85 which generates addresses for the buffer RAM 6 to determine where each of the data bits received from the teletext detector 5 are stored within the buffer RAM 6. The timing generator has further outputs which are fed to a read address generator 87 and an output 88 which forms a read enable signal for the buffer RAM 6. The read address generator 87 produces an output on output 89 to determine those addresses from which the data is read and passed to the encoder 7.

On playback the switches S1 and S2 are switched to their other position and an input 90 receives a signal from the teletext decoder 13 while an input 91 receives the CBVS signal from the luminance processor 10. The signal from the teletext decoder 13 will include a clock signal which defines the data rate of the information coming into the decoder 13 while the CBVS signal on input 91 will provide line and field synchronising pulses which are generated from the signal replayed from the tape. As with the record function on the playback function the output 82 will provide a write enable signal to the buffer RAM 6 which will cause data to be written from the decoder 13 into appropriate locations within the RAM 6 determined by the write address generator 85. The half rate teletext clock which is generated by the data slicer and clock recovery circuit 133 is fed to the timing generator 84 to enable the write address generator to be clocked at the appropriate rate for the data emanating from the decoder 13. The write enable signal is generated when the framing code detector has detected the presence of framing code and thus the decoder 13 is producing the teletext data at its output for writing into the buffer RAM 6. The read address generator 87 is stepped at the teletext data rate while the read enable output allows the data to be read from the buffer RAM 6 at the end of the framing code.

As seen in FIG, 4 the teletext encoder 14 will receive from the control and timing signal generator 9 a signal when the start of a line on which the teletext signal is to be inserted occurs. The teletext encoder 14 will include a clock run in and framing code generator as this will enable the RAM 6 not to include storage capacity for those particular parts of a teletext line since they are common to all teletext lines. At the end of the framing period data is read from the RAM 6 to the teletext encoder 14 which also receives from the control and timing signal generator 9 the teletext clock which has been derived from the teletext signal replayed from the tape and is thus correctly timed with respect to the video signal replayed from the tape.

The RAM 6 may be arranged to store a field of teletext data in which case the data is written into successive locations in the RAM and read out one field later on the same line as the teletext signal was transmitted to the video recorder. Alternatively the RAM may store one line of teletext data, the teletext data being inserted onto the next line of the VBI. By suitably constructing the control and timing signal generator 9 it is, of course, possible to prevent the displaced teletext data from occurring on lines which also contain video information. Thus it does not require any greater storage if in fact a teletext signal has to be delayed from the last available line of a VBI on one field and be inserted on the first available line of the VBI on the next field. A further possibility if all the available VBI lines are not being used for teletext transmission the teletext data could be repeated on the spare VBI lines to give rather more robustness. Thus if one line contains errors the repeated version may be error free. This clearly can only be used where there are spare VBI lines.

An additional possibility is to use the buffer RAM 6 to delay the insertion of teletext data into the VBI lines until closer to the end of the VBI as this will minimise the effects of the head switching of the recorder.

It will be apparent that the details of the control and timing generator 9 shown in FIG. 8 are those which are relevant to the writing in and reading out of data to the RAM 6. The control and timing circuit 9 will also include conventional timing generation apparatus to enable television line numbers and fields to be identified and appropriate signals generated to control the multiplexers 8 and 15 and the encoders 7 and 14 and decoder 13. These consist of clock signals related to the line frequency and selecting appropriate ones of the television lines for insertion of the teletext data.

Although the description has been with reference to a VHS video recorder the invention is applicable wherever a narrower channel bandwidth than that required by the standard teletext data rate (as defined by the World System Teletext Standard) and could be applied, for example, to recordable disc formats.

From reading the present disclosure, other modifications will be apparent to persons skilled in the art. Such modifications may involve other features which are already known in the design and use of teletext and video recorder circuits and data encoding techniques and circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention.

What is claimed is:

1. A method of recording teletext data comprising the steps of:

receiving teletext data at a standard data rate of teletext data;

converting the teletext data to a multilevel code having more than two code levels, at a data rate which is lower than the standard data rate of the teletext data, the converting comprising applying the received teletext data to an encoder in n-bit packets, where n is greater than one, and converting each n-bit packet into the multilevel code, the multilevel code having at least one level for each n-bit combination; and recording the multilevel code on a record carrier at a data rate of 1/n times the standard teletext data rate.

2. The method of claim 1 in which the multilevel code includes a signal having more than two amplitude levels that provide respective code levels.

3. The method of claim 1 in which the multilevel code has four code levels and the lower data rate is half of the standard teletext data rate.

4. The method of claim 1 in which the multilevel code has eight code levels and the lower data rate is one third of the standard teletext data rate.

5. A method of replaying teletext data comprising the steps of:

reading a multilevel code from a record carrier at a data rate of 1/n times a standard data rate of teletext data, where n is greater than one, the multilevel code having more than two code levels;

converting the multilevel code to standard teletext data in n-bit packets, and applying the teletext data to a teletext encoder.

6. Apparatus for recording teletext data, comprising:

means for receiving a video signal including teletext data, means for detecting received valid teletext data, means for encoding the received teletext data into a multilevel code having more than two code levels, at a data rate which is less than the standard teletext data rate, the means for encoding including means for applying the received teletext data to an encoder in n-bit packets, where n is greater than one, and means for converting each n-bit packet into the multilevel code, the multilevel code having at least one level for each n-bit combination and means for recording the multilevel code on the record carrier at a data rate of 1/n times the standard teletext data rate.

7. The apparatus of claim 6 in which n=2.

8. The apparatus of claim 6 in which n=3.

9. The apparatus of claim 6 further comprising a buffer RAM connected between the means for detecting teletext data and the means for encoding.

10. The apparatus of claim 9 in which:

the buffer RAM receives only teletext data packets; and the encoding means generate a clock run in and a framing code.

11. The apparatus of claim 6 in which the multilevel code includes a plurality of amplitude levels that provide respective code levels.

12. Apparatus for replaying teletext data, comprising:

means for feeding a multilevel code signal having more than 2 code levels, at a data rate of 1/n times a standard data rate of teletext data, where n is greater than one, to a decoder to convert the multilevel code to a binary code in n-bit packets at the standard teletext data rate; and means for multiplexing the binary code with the video signal for application to a teletext decoder.

13. The apparatus of claim 12 in which the multilevel code is a four level code and the decoder produces two bits from each four level code.

14. The apparatus of claim 12 in which the multilevel code is an eight level code and the decoder produces three bits from each eight level code.

15. The apparatus of claim 12 in which data from the decoder is written into a buffer RAM.

16. The apparatus of claim 15 further comprising a teletext encoder to receive data from the buffer RAM.

17. The apparatus of claim 15 in which the teletext encoder includes means for generating the clock run-in and framing code.

18. The apparatus of claim 12 in which the decoder includes an equalizer.

19. The apparatus of 18 in which the equalizer is a decision feedback equalizer.

20. The apparatus of claim 12 in which the multilevel code includes a plurality of amplitude levels that provide respective code levels.

21. The method of claim 1 in which the multilevel code includes a signal having a first phase and one or more additional phases that provide respective code levels.

22. The apparatus of claim 6 in which the multilevel code includes a signal having a first phase and one or more additional phases that provide respective code levels.

23. The method of claim 12 in which the multilevel code includes a signal having a first phase and one or more additional phases that provide respective code levels.

24. The method of claim 1 in which:

the multilevel code includes a signal having more than two amplitude levels;

the multilevel code includes a signal having more than one phase; and the multilevel code has four code levels and the lower data rate is half of the standard teletext data rate or the multilevel code has eight code levels and the lower data rate is one third of the standard teletext data rate.

25. The method of claim 5 in which:

the multilevel code includes a signal having more than two amplitude levels;

the multilevel code includes a signal having more than one phase; and the multilevel code has four code levels and the multilevel code has a data rate of half of the standard teletext data rate or the multilevel code has eight code levels and the the multilevel code has a data rate of one third of the standard teletext data rate.

26. The apparatus of claim 6 in which n=2 or n=3;

a buffer RAM is connected between the means for detecting teletext data and the encoder;

the buffer RAM receives only teletext data packets; and the encoder includes means for generating the clock run in and framing code;

the multilevel code includes three or more amplitude levels; and the multilevel code includes a plurality of signal phases.

27. The apparatus of claim 12 in which:

the multilevel code is selected from: a four level code and the decoder produces two bits from each four level code; and an eight level code and the decoder produces three bits from each eight level code;

data from the decoder is written into a buffer RAM;

the apparatus further comprises a teletext encoder to receive data from the buffer RAM;

the teletext encoder includes means for generating the clock run-in and framing code;

the decoder includes an equalizer;

the equalizer is a decision feedback equalizer;

the multilevel code includes a plurality of amplitude levels; and the multilevel code includes a plurality of phases.

* * * * *